UNITED STATES PATENT OFFICE.

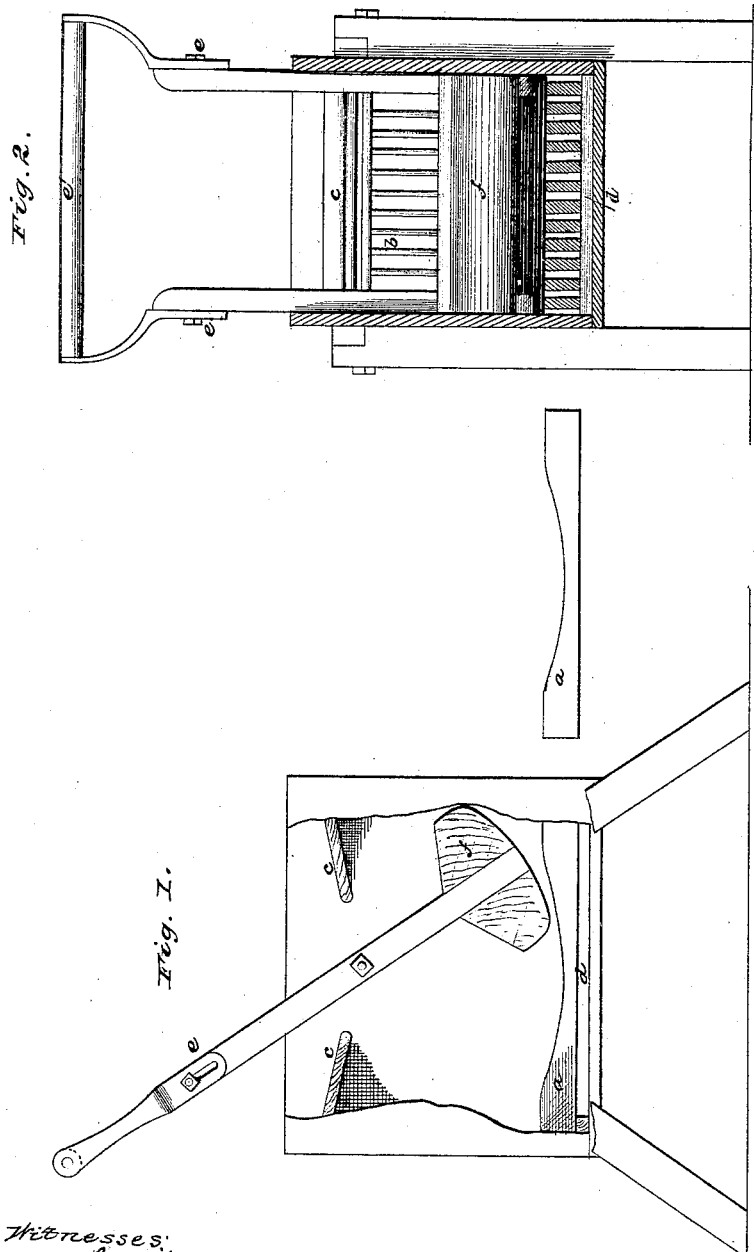

ALEXANDER BADLAM, SR., OF SAN FRANCISCO, CALIFORNIA.

IMPROVED WASHING-MACHINE.

Specification forming part of Letters Patent No. 58,753, dated October 16, 1866.

*To all whom it may concern:*

Be it known that I, ALEXANDER BADLAM, Sr., of the city and county of San Francisco, State of California, have invented certain new and useful Improvements in Washing-Machines, called the "Golden State Washing-Machine;" and I hereby declare the following description and accompanying drawings are sufficient to enable any person skilled in the art or science to which it most nearly appertains to make and use my said invention or improvements without further invention or experiment.

The nature of my invention will be readily explained by referring to the claim and drawings, in which—

Figure 1 represents a side view of my machine with a part removed; Fig. 2, a front view with side entirely removed.

*a a* represent a series of slats, placed parallel across the bottom of the machine, and are concave to receive the dasher. Beneath these slats is a water-chamber, *d*, covering the whole bottom of the machine.

The dasher *f* is of wood, with convex bottom and incline sides, and constructed to fit the concave edges of the slats, and may be corrugated or grooved. Above the dasher I place upright pins or rods *b*, of wood or metal, the lower ends of which set in the top of the dasher, and the upper ends in a parallel bar or rod, which connects with right and left upright arms. Near the top of the upright arms I attach dogs *e e*, of metal, which are raised or lowered by slots, set-screws, and nuts. To these dogs I attach a parallel roller, *e'*, which turns in the hand on a rod. I also place dash-boards *c c*, parallel to each other, lengthwise across the machine, above the dasher *f*, which serve to keep the water from dashing up into the face of the operator, the whole attached to and resting firmly on legs.

Some of the advantages of my washing-machine may be enumerated as follows, to wit:

First, by placing the water chamber below the slats a more full supply of water is had than where the clothes rest upon a solid bottom, and the water will enter the clothes below as well as around and above them, and the dirt settle in the bottom of the chamber, and does not come in contact with the cleansed pieces, as where the whole is allowed to mingle together.

Second, the slats, which are about twelve in number, more or less, are set edgewise beneath the dasher and above the bottom of the box, and conform to the curved course of the dasher, which passes to within about five inches of the said slats, forming an inclined plane, whereon the rolls of clothing revolve when struck just below their centers by the dasher. The force being applied at this point is more effectual than in other machines, where it is made to act or brought to bear on the lowest point or bottom of the clothes; also, the water circulates more freely beneath and through the articles that are being washed.

Third, the pins being placed along the top of the dasher keeps the two rolls of clothing apart, so that each division may revolve independent of the other; and the two shelves above the dasher confine the clothes and keep the water from splashing; also, the convenience of the application of the power by means of the brakes and hand-roller with the two dogs, which serve as weights as well as sockets, rendering the machine as a whole one of great utility.

I claim—

The combination and arrangement of the water-box, with curved slats *a*, metal dogs *e e*, serving as weights, handle *e'*, and dash-boards *c c*, the whole being constructed and arranged for joint operation, substantially as described.

ALEXANDER BADLAM, SR. [L. S.]

Witnesses:
C. W. M. SMITH,
C. J. MILLER.